(12) United States Patent
Watanabe

(10) Patent No.: US 7,409,161 B2
(45) Date of Patent: Aug. 5, 2008

(54) FREE SPACE OPTICS COMMUNICATION APPARATUS AND FREE SPACE OPTICS COMMUNICATION SYSTEM

(75) Inventor: Harukazu Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 10/652,660

(22) Filed: Aug. 28, 2003

(65) Prior Publication Data

US 2004/0042717 A1 Mar. 4, 2004

(30) Foreign Application Priority Data

Aug. 30, 2002 (JP) ............................. 2002-255354

(51) Int. Cl.
*H04B 10/00* (2006.01)
(52) U.S. Cl. ...................................... 398/130; 398/201
(58) Field of Classification Search ......... 398/118–131, 398/201; 359/159
See application file for complete search history.

(56) References Cited

U.S. PATENT DOCUMENTS

| | | | | |
|---|---|---|---|---|
| 4,727,600 A | * | 2/1988 | Avakian | 398/126 |
| 4,753,506 A | * | 6/1988 | Einhorn et al. | 385/26 |
| 5,134,426 A | * | 7/1992 | Kataoka et al. | 347/244 |
| 5,359,448 A | * | 10/1994 | Laszlo et al. | 398/130 |
| 5,777,768 A | * | 7/1998 | Korevaar | 398/129 |

* cited by examiner

*Primary Examiner*—Christina Y Leung
(74) *Attorney, Agent, or Firm*—Morgan & Finnegan, LLP

(57) ABSTRACT

A free space optics communication apparatus which can perform stable communication is disclosed. The free space optics communication apparatus has a plurality of light-emitting units each emitting a light beam which forms a generally elliptical irradiation pattern. The plurality of light-emitting units are set such that irradiation patterns of beams from at least two of the plurality of light-emitting units partially overlap at a light-receiving unit of the other apparatus. Further the width of a combined irradiation pattern formed by combining the light beams is 1.5 times or more larger than a width in a shorter diameter direction of an irradiation pattern of a light beam from one light-emitting unit.

6 Claims, 5 Drawing Sheets

FREE SPACE OPTICS COMMUNICATION APPARATUS AND FREE SPACE OPTICS COMMUNICATION SYSTEM

BACKGROUND OF THE INVENTION

1. Field of the Invention

The present invention relates to a free space optics communication apparatus and a free space optics communication system which use light beams to perform communication with another apparatus installed at a remote location.

2. Description of Related Art

In a free space optics communication apparatus of the type described above, even a single light source can transmit a light signal. However, a plurality of light sources are used in many cases to increase transmission power in order to seek resistance to attenuation due to rain or fog in consideration of the function of propagating the light signal through the free space.

FIG. 5A shows a front view and a side view of a free space optics communication apparatus 40 which has a plurality of light sources. In FIG. 5A, reference numerals 43a to 43d show light sources, and reference numerals 41a to 41d show transmission optical systems which condense light emitted from the light sources 43a to 43d, respectively, and including information to be transmitted, form the light into beams, and send the beams toward another apparatus (not shown).

Reference numeral 42 shows a reception optical system. Light from another apparatus is condensed through the reception optical system 42 to a light signal detection element 44 such as an APD and a Pin-Photodiode to receive the light signal.

For the light sources 43a to 43d, a semiconductor laser is often used since it enables fast modulation, high output power, easy coupling of output light to an optical system, and the like.

As shown in FIG. 6, an irradiation pattern 61 of a semiconductor laser (a semiconductor laser diode chip) 60 has a generally elliptical shape in which Gaussian intensity distributions 61a and 61b are included in a longer diameter (the major axis) direction and a shorter diameter (the minor axis) direction, respectively. The Gaussian intensity distribution 61b in the shorter diameter direction is more compressed than the Gaussian intensity distribution 61a in the longer diameter direction.

In the free space optics communication apparatus 40 which uses a plurality of the semiconductor lasers as the light sources 43a to 43d, the transmission optical systems 41a to 41d have optical axes set in parallel with one another to allow another apparatus at a remote location to efficiently receive all light beams. As a result, as shown in FIG. 5B, the irradiation patterns of the respective light beams at a light-receiving unit of the other apparatus overlap one another for the most part with the centers of the patterns separated from one another corresponding to the spacings between the optical axes of the transmission optical systems 41a to 41d.

When a combined irradiation pattern of the plurality of light beams at the light-receiving unit of the other apparatus has a generally elliptical shape as shown in FIG. 5B, the pattern has a smaller width in a shorter diameter direction.

Especially when swinging due to wind pressure or vibrations, distortion due to temperature changes, or angle variations due to changes over time occur in a building or a base on which the free space optics communication apparatus is installed, the light beam from the apparatus is likely to arrive at the light-receiving unit of the other apparatus with a shift or a deviation in a shorter diameter direction. Thus, the light-receiving unit receives a reduced amount of light or, in a worse case, no light, so that stable communication is difficult to achieve.

SUMMARY OF THE INVENTION

It is an object of the present invention to provide a free space optics communication apparatus (transmission apparatus) and a free space optics communication system which use light-emitting units for forming beam irradiation patterns of elliptical shape, in which stable communication can be performed even when a light beam received at another apparatus is shifted from the apparatus in a shorter diameter direction of the beam irradiation patterns.

To achieve the aforementioned object, a free space optics communication apparatus according to an aspect of the present invention has a plurality of light-emitting units each emitting a light beam which forms a generally elliptical irradiation pattern on the other apparatus. The plurality of light-emitting units are set such that irradiation patterns of beams from at least two of the plurality of light-emitting units partially overlap at a light-receiving unit of the other apparatus. In addition, the plurality of light-emitting units are set such that a width of a combined irradiation pattern formed by combining a group of light beams from the plurality of light-emitting units in a shorter diameter direction of an irradiation pattern of a beam from one of the plurality of light-emitting units is 1.5 times or more larger than a width in the shorter diameter direction of the irradiation pattern of the light beam from the one light-emitting unit.

According to another aspect of the present invention, a transmission apparatus which transmits information to a reception apparatus through light beams comprises a first light-emitting unit and a second light-emitting unit each emitting a light beam, the light beam having an angle of divergence. A first direction in which the light beam emitted from the first light-emitting unit is inclined by an angle smaller than the angle of divergence with respect to a second direction in which the light beam emitted from the second light-emitting unit.

According to another aspect of the present invention, a transmission apparatus which transmits information to a reception apparatus through light beams comprises a first light-emitting unit and a second light-emitting unit each emitting a light beam, the light beam having a cross section of generally elliptical shape. A first shorter diameter direction of the generally elliptical shape of the cross section of the light beam from the first light-emitting unit is inclined with respect to a second shorter diameter direction of the generally elliptical shape of the cross section of the light beam from the second light-emitting unit.

According to another aspect of the present invention, an apparatus which transmits information by directing a light beam through a free space comprises a plurality of light-emitting units, each of the sections having an optical axis and emitting a light beam which has a cross unit having a shorter side direction, and the plurality of light-emitting units including a first light-emitting unit and a second light-emitting unit, the first light-emitting unit having an optical axis inclined with respect to an optical axis of the second light-emitting unit such that the optical axes are separated from each other in the shorter side direction.

According to another aspect of the present invention, an apparatus which transmits information by directing light beams through the free space, comprising a plurality of light-emitting units, each of the units having an optical axis and emitting a light beam which has a cross section having a shorter side direction, and the plurality of light-emitting units including a first light-emitting unit and a second light-emitting unit which emit light beams with the shorter side directions different from each other.

These and other characteristics of the free space optics communication apparatus and the free space optics communication system according to the present invention will be apparent from the following description of specific embodiments with reference to the drawings.

DETAILED DESCRIPTION OF THE PREFERRED EMBODIMENTS

Preferred embodiments of the present invention are hereinafter described with reference to the drawings.

Embodiment 1

Figure 1:
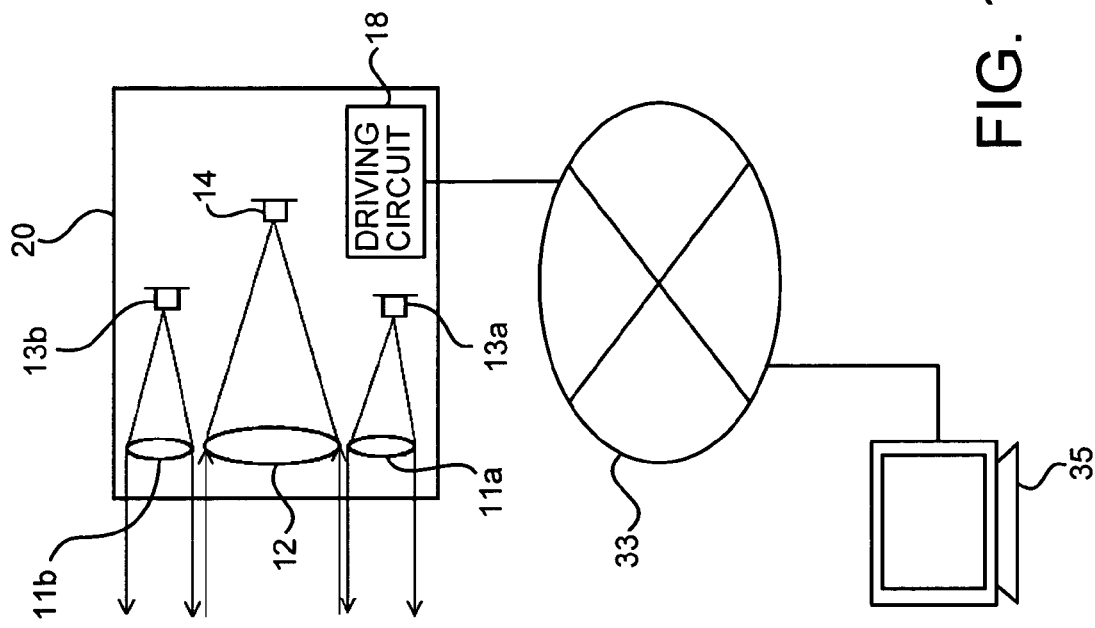
FIG. 1 is a schematic diagram showing the structure of a free space optics communication system including a free space optics communication apparatus, which is Embodiment 1 of the present invention, and another apparatus.
Figure 1:
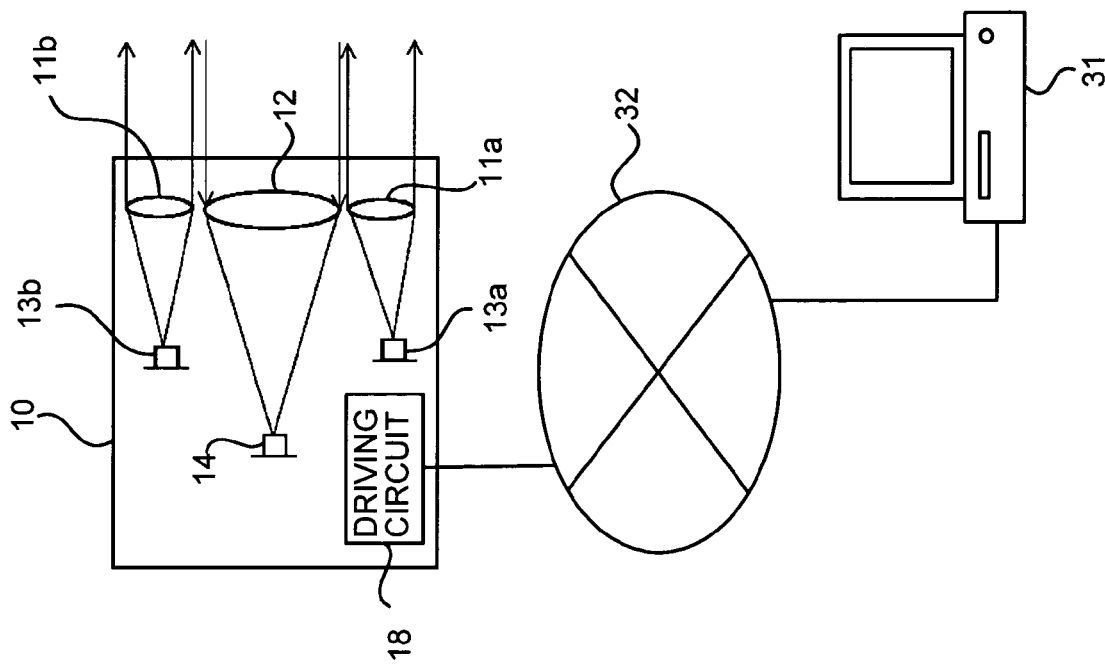
Figure 2:
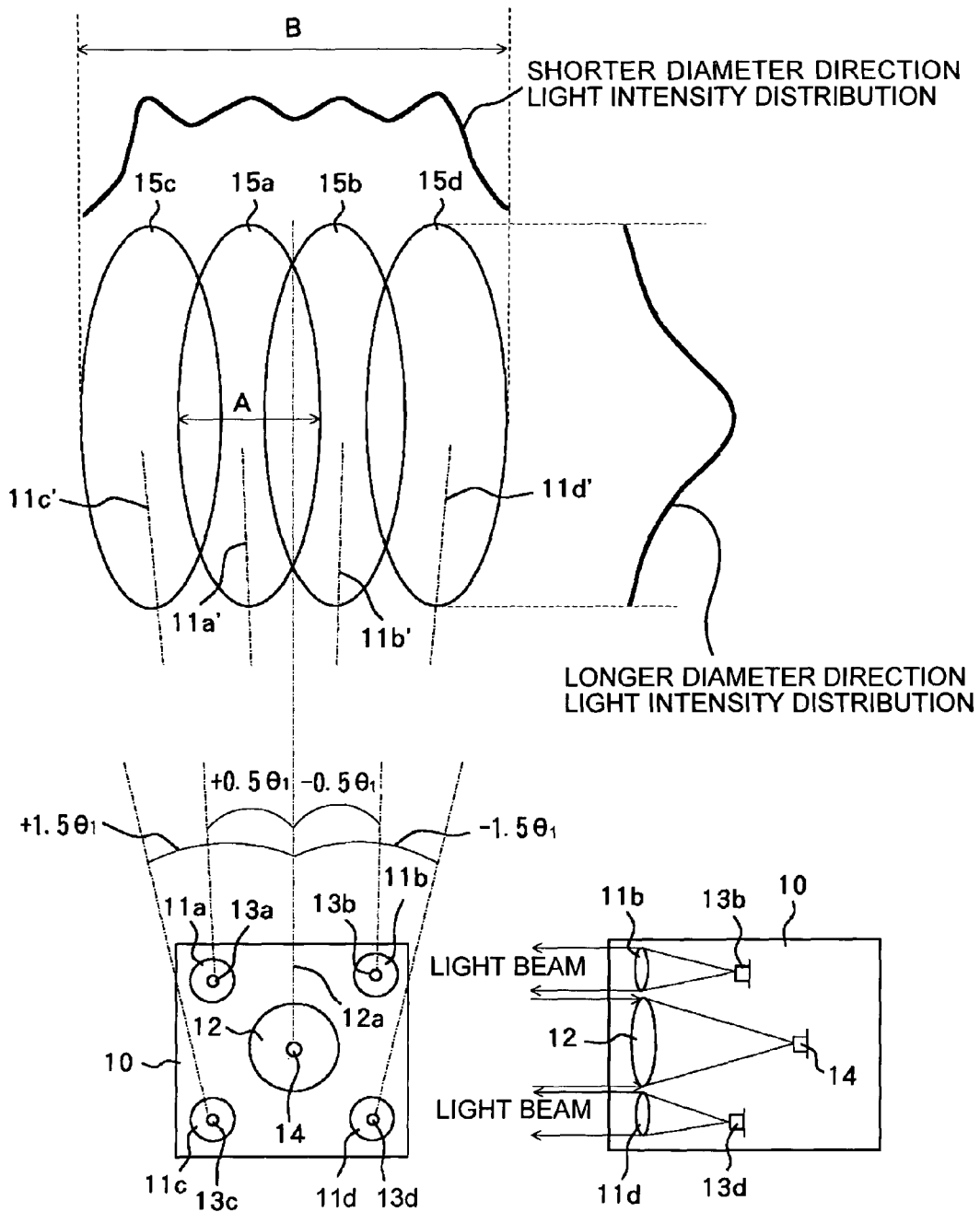
FIG. 2 shows a front view and a side view showing the structure of the free space optics communication apparatus of Embodiment 1, and beam irradiation patterns at a light-receiving unit of the other apparatus.

FIG. 1 schematically shows the structure of a free space optics communication system including a free space optics communication apparatus, which is Embodiment 1 of the present invention, and another apparatus. FIG. 2 shows the structure of a free space optics communication apparatus and irradiation (reception) patterns of light beams in another apparatus. A front view and a side view of the free space optics communication apparatus are shown in the lower portion of FIG. 2.

In FIGS. 1 and 2, reference numeral 10 shows the free space optics communication apparatus. Reference numeral 20 shows another apparatus which is installed at a remote location from the free space optics communication apparatus 10 (but within a range in which light beams can reach the other apparatus 20) and transmits and receives information through light beams to and from the free space optics communication apparatus 10. The structure of the other apparatus 20 is the same as the free space optics communication apparatus 10.

The free space optics communication apparatus 10 (and the other apparatus 20) has a driving circuit 18 which drives light sources (13a and 13b in FIG. 1), later described, and is electrically connected to a light-receiving unit which includes a detection element designated with 14 in FIG. 1. The driving circuit 18 is connected to a communication line 32 such as the Internet and LAN. In response to image information or text information transmitted from an information output apparatus 31 such as a personal computer connected to the communication line 32, the driving circuit 18 drives the light sources to cause light beams including the information to emit.

The other apparatus 20 receives the light beams at a light-receiving unit and converts the beams into a signal transmittable through another communication line 33 (such as the Internet and LAN). The signal is received by an information receiving apparatus 35 such as a monitor through the other communication line 33. The information receiving apparatus 35 displays the received information as an image or processes the information as appropriate.

In FIG. 2, reference numerals 13a to 13d show semiconductor lasers as light sources. Reference numerals 11a to 11d show transmission optical systems which condense laser light emitted from the semiconductor lasers 13a to 13d, respectively, and including signals, form the light into beams, and transmit the beams toward the other apparatus 20. One semiconductor laser and one transmission optical system constitute one light-emitting unit. Embodiment 1 has four light-emitting units.

Reference numeral 12 shows a reception optical system. Light from the other apparatus 20 is condensed on the light signal detection element 14 such as an APD or a Pin-Photodiode through the reception optical system 12 to receive the light signal. The four semiconductor lasers 13a to 13d are disposed radially with the reception optical system 12 positioned at the center.

In Embodiment 1, the four light-emitting units each formed of the semiconductor laser and the transmission optical system are fixed to the apparatus body in such a manner that the directions of optical axes 11a' to 11d' thereof form angles in relation to each other in a shorter diameter direction of irradiation patterns 15a to 15d.

Figure 6:
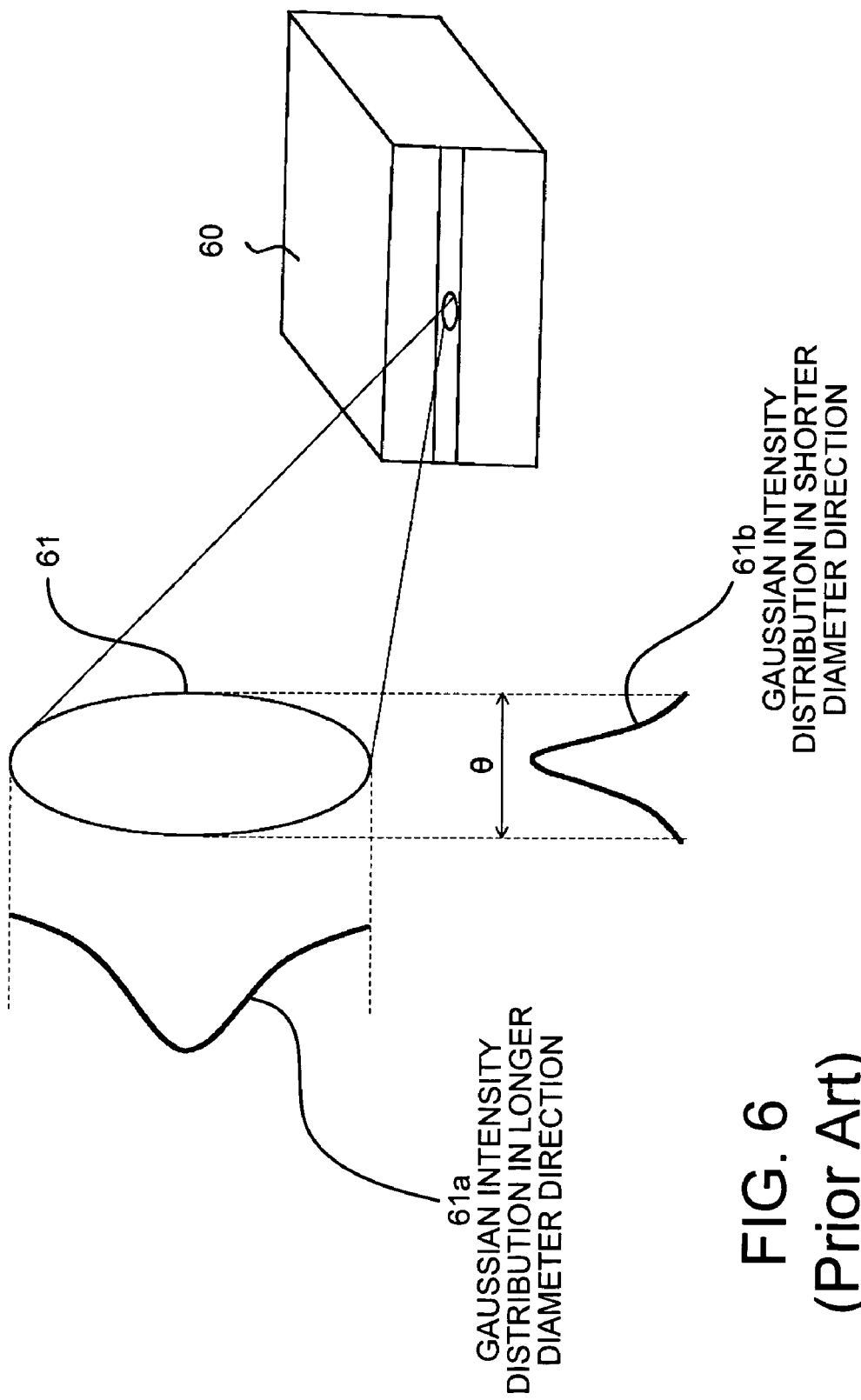
FIG. 6 shows a beam irradiation pattern of a semiconductor laser.

A light beam emitted from each of the light-emitting unit has a generally elliptical cross section as shown in FIG. 6. The angle of divergence in the shorter diameter direction of the light beam which forms each of the irradiation patterns 15a to 15d in the light-receiving unit (the detection element 14) of the other apparatus 20 is equal to an angle θ1 which is slightly smaller than the angle of divergence θ of the light beam in the shorter diameter direction shown in FIG. 6. The irradiation pattern used herein refers to a light intensity distribution area in which the light intensity ranges from its peak value to a value equal to $1/e^2$ of the peak value.

More specifically, when the optical axis of the reception optical system 12 (the direction of the other apparatus 20) is defined as a reference optical axis 12a of the apparatus 10, and the left and right are defined as positive and negative in FIG. 2, respectively, then the optical axis 11a' of the light-emitting unit (13a, 11a) is inclined +0.5 θ1 with respect to the reference axis 12a, the optical axis 11c' of the light-emitting unit (13c, 11c) is inclined +1.5 θ1, the optical axis 11b' of the light-emitting unit (13b, 11b) is inclined −0.5 θ1, and the optical axis 11d' of the light-emitting unit (13d, 11d) is inclined −1.5 θ1.

With these arrangements, two of the four beam irradiation patterns 15a to 15d partially overlap in the shorter diameter direction of the beam irradiation patterns. As shown in the upper portion of FIG. 2, a width B in the shorter diameter direction of a combined irradiation pattern formed by combining the four beam irradiation patterns 15a to 15d (that is, the laser beam group) is 1.5 times or more larger, or 2 times or more larger than a width A in the shorter diameter direction of one beam irradiation pattern.

The light intensity distribution in the shorter diameter direction of each of the beam irradiation patterns (15a to 15d) has a Gaussian distribution as shown by 61b in FIG. 6. However, the light intensity distribution in the shorter diameter direction of the combined irradiation pattern in Embodiment 1 has an area near the peak intensity (an area with generally uniform intensity) with a greater width than the example shown in the related art, in FIG. 2.

Thus, even when the optical axis (the reference axis) 12a of the apparatus 10 is significantly shifted in any direction from the other apparatus 20, the amount of light received at the light-receiving unit of the other apparatus 20 is not greatly reduced, and stable communication can be performed.

Embodiment 2

Figure 3:
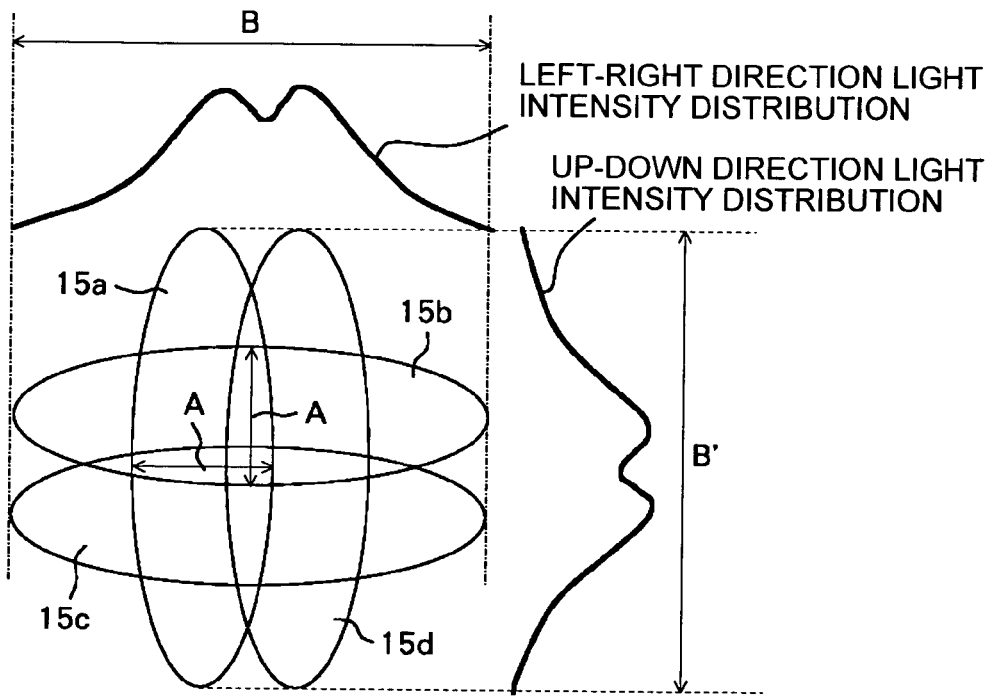
FIG. 3 shows beam irradiation patterns at a light-receiving unit of another apparatus according to a free space optics communication apparatus which is Embodiment 2 of the present invention.

FIG. 3 shows irradiation patterns of light beams emitted from four light-emitting units provided in a free space optics communication apparatus, which is Embodiment 2 of the present invention, and received at a light-receiving unit of another apparatus. Since the basic structure of Embodiment 2 is the same as that in Embodiment 1, components identical to those in Embodiment 1 are designated with the same reference numerals to describe Embodiment 2.

In Embodiment 2, the semiconductor lasers 13b and 13c of the light-emitting units described in Embodiment 1 are rotated by 90 degrees about their optical axes such that light beams from the lasers 13b and 13c form horizontally oblong irradiation patterns 15b and 15c.

The optical axis of the light-emitting unit (13a, 11a in FIG. 2) is set at +0.5 θ1 in the horizontal (left-right) direction and 0 degrees in the vertical direction with respect to the reference axis 12a. The optical axis of the light-emitting unit (13d, 11d) is set at −0.5 θ1 in the horizontal (left-right) direction and 0 degrees in the vertical direction with respect to the reference axis 12a.

The optical axis of the light-emitting unit (13b, 11b) is set at 0 degrees in the horizontal (left-right) direction and +0.5 θ1 in the vertical direction with respect to the reference axis 12a. The optical axis of the light-emitting unit (13c, 11c) is set at 0 degrees in the horizontal (left-right) direction and −0.5 θ1 in the vertical direction with respect to the reference axis 12a.

With the setting, the light intensity distribution in the left-right direction is substantially the same as the light intensity distribution in the up-down direction in the light-receiving unit of the other apparatus. In addition, in a combined irradiation pattern formed by combining the four beam irradiation patterns 15a to 15d, for example, a width B in the shorter diameter direction (left-right direction) of the beam irradiation pattern 15a and a width B' in the shorter diameter direction (up-down direction) of the beam irradiation pattern 15b are each 1.5 times or more, or 2 times or more larger than a width A in the shorter diameter direction of one beam irradiation pattern.

Furthermore, each light intensity distribution in the left-right direction and up-down direction of the combined irradiation pattern has an area near the peak intensity with a greater width than the example shown in the related art in FIG. 2, similarly to Embodiment 1.

Therefore, even when the optical axis (the reference axis) of the apparatus is significantly shifted in any direction from the other apparatus, the amount of light received at the light-receiving unit of the other apparatus is not greatly reduced, and stable communication can be performed.

Embodiment 3

Figure 4:
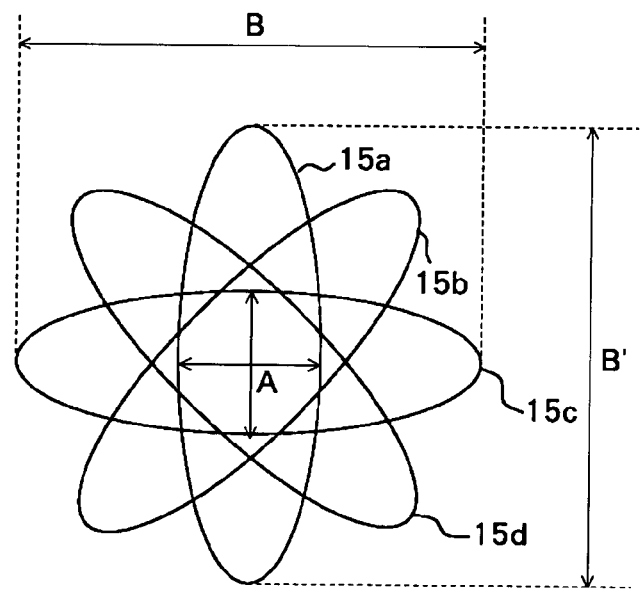
FIG. 4 shows beam irradiation patterns at a light-receiving unit of another apparatus according to a free space optics communication apparatus which is Embodiment 3 of the present invention.
Figures 5A, 5B:
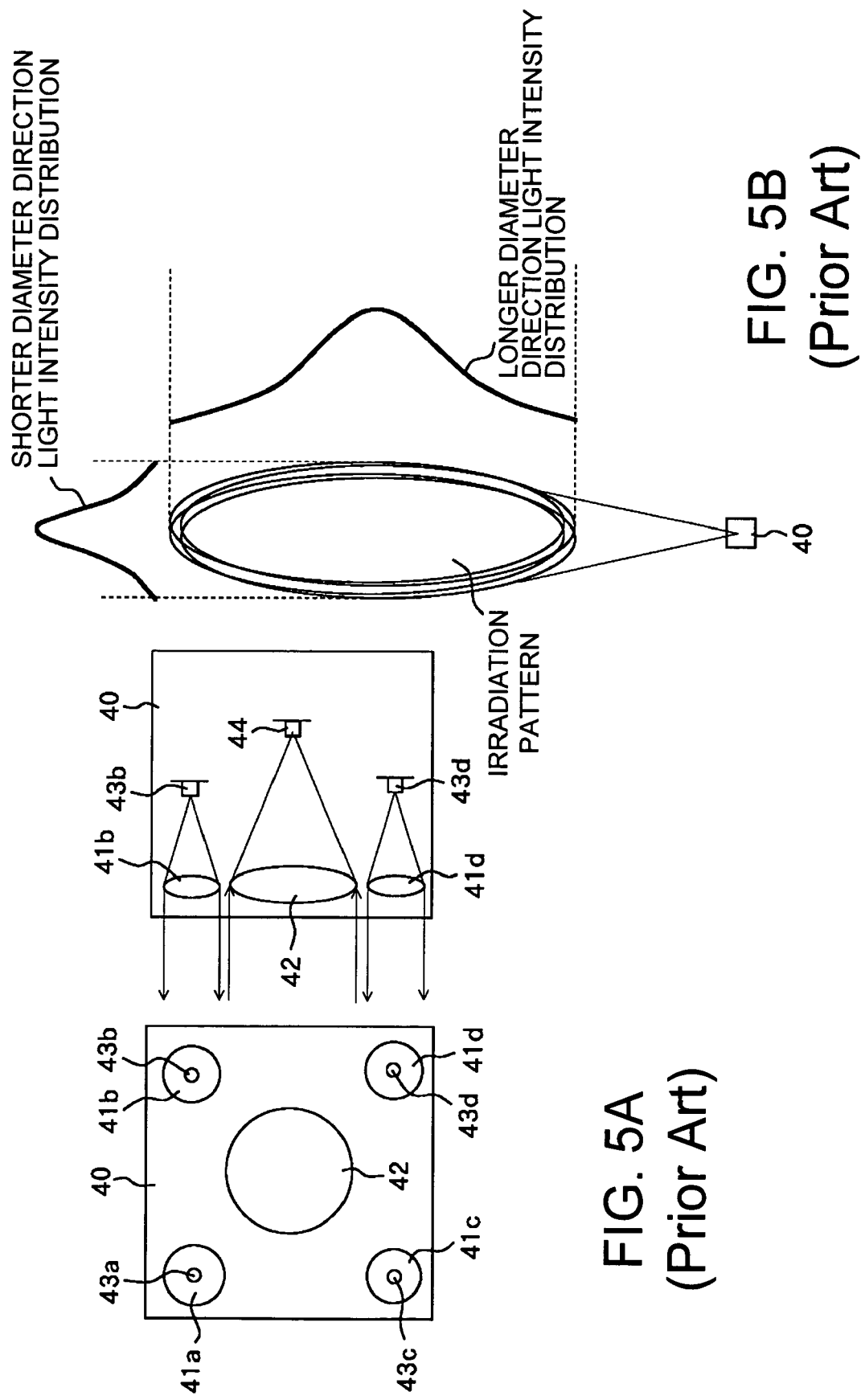
FIG. 5A shows a front view and a side view showing the structure of a conventional free space optics communication apparatus.
FIG. 5B shows irradiation patterns of light beams sent from the conventional free space optics communication apparatus observed at a light-receiving unit of another apparatus.

FIG. 4 shows beam irradiation patterns of light beams emitted from four light-emitting units provided in a free space optics communication apparatus, which is Embodiment 3 of the present invention, and received at a light-receiving unit of another apparatus. Since the basic structure of Embodiment 3 is the same as that in Embodiment 1, components identical to those in Embodiment 1 are designated with the same reference numerals to describe Embodiment 3.

In Embodiment 3, the semiconductor lasers 13a to 13d of the four light-emitting units described in Embodiment 1 are rotated about their optical axes such that light beams emitted from the two adjacent lasers form an angle of 45 degrees about the reference axis (12a in FIG. 1).

When n light sources are present, each light source is rotated such that light beams emitted from the adjacent light sources form an angle calculated by 360/(n×2) degrees.

It should be noted that the optical axes of the respective light-emitting units form 0 degrees with respect to the reference axis 12a both in the horizontal and vertical directions. In other words, the optical axes are in parallel with the reference axis 12a.

In Embodiment 3, symmetrical light intensity distribution can be provided in any vertical, horizontal, or diagonal direction about the center of a combined irradiation pattern formed by combining four beam irradiation patterns 15a to 15d, and the intensity is at the maximum in the center. Similarly to Embodiment 2 described above, in the combined irradiation pattern formed by combining the four beam irradiation patterns 15a to 15d, for example, a width B in the shorter diameter direction (left-right direction) of the beam irradiation pattern 15a and a width B' in the shorter diameter direction (up-down direction) of the beam irradiation pattern 15c are each 1.5 times or more larger, or 2 times or more larger than a width A in the shorter diameter direction of one beam irradiation pattern.

Thus, even when the optical axis (the reference axis) of the apparatus is shifted in any direction from the other apparatus, the amount of light received at the light-receiving unit of the other apparatus is not greatly reduced, and stable communication can be performed.

While each of Embodiments 1 to 3 has been described for the case where the four light-emitting units are provided, any number of the light-emitting units may be formed according to cost and performance requirements as long as two or more light-emitting units are provided.

As described above, in each of Embodiments 1 to 3, the light-emitting units are set such that the irradiation patterns of the beams from at least two of the plurality of light-emitting units received at the light-receiving unit of the other apparatus overlap in the shorter diameter direction of the irradiation pattern of the light beam from one light-emitting unit. Alternatively, the light-emitting units are set such that the longer diameter direction axes (or the shorter diameter direction axes) of the irradiation patterns of the beams from at least two of the plurality of light-emitting units intersect at the light-receiving unit.

With the setting, even when the irradiation pattern of the beam from each light-emitting unit has a generally elliptical shape, the width of the combined irradiation pattern formed by combining the irradiation patterns can be 1.5 times or more larger (or 2 times or more larger) than the width in the shorter diameter direction of one beam irradiation pattern in the shorter diameter pattern.

Thus, stable communication can be performed even with a shift of the optical axis direction of the apparatus in any direction from the other apparatus.

While preferred embodiments have been described, it is to be understood that modification and variation of the present invention may be made without departing from the scope of the following claims.

What is claimed is:

1. A free space optics communication apparatus which performs communication with another apparatus with light beams, comprising:

a plurality of light-emitting units, each of the units emitting a light beam which forms a generally elliptical irradiation pattern on a light-receiving unit of the other apparatus having a shorter diameter direction and a longer diameter direction, wherein the plurality of light-emitting units are set in such a way that an overlapping degree of irradiation patterns of light beams from at least two of the plurality of light-emitting units in the shorter diameter direction at the light-receiving unit of the other apparatus is adjusted, and thereby respective optical axes of the plurality of light-emitting units are inclined with different angles each other with respect to a reference axis of the free space optics communication apparatus so that a width of a combined irradiation pattern formed by combining the light beams from the plurality of light-emitting units is 1.5 times or larger than a width of the irradiation pattern formed by one light-emitting unit in the shorter diameter direction at the light-receiving unit of the other apparatus.

2. The free space optics communication apparatus according to claim 1, wherein the plurality of light-emitting units are set such that the width of the combined irradiation pattern formed at the light-receiving unit by combining the light beams from the plurality of light-emitting units in the shorter diameter direction of the irradiation pattern of the light beam from the one light-emitting unit is 2 times or more larger than the width of the irradiation pattern of the light beam from the one light-emitting unit.

3. The free space optics communication apparatus according to claim 1, wherein the plurality of light-emitting units emit light beams toward the other apparatus such that longer diameter direction axes of irradiation patterns of light beams from at least two of the plurality of light-emitting units intersect at the light-receiving unit.

4. The free space optics communication apparatus according to claim 1, wherein each of the light-emitting units includes a light source and an optical system which condenses light emitted from the light source.

5. The free space optics communication apparatus according to claim 1, wherein the light source is a semiconductor laser.

6. A free space optics communication system comprising:

the free space optics communication apparatus according to claim 1; and another apparatus which has a light-receiving unit which receives light beams irradiated from the free space optics communication apparatus.

* * * * *